United States Patent [19]
Jung et al.

[11] Patent Number: 5,703,882
[45] Date of Patent: Dec. 30, 1997

[54] CYCLIC LINE CODING APPARATUS FOR ERROR DETECTION AND FRAME RECOVERY

[75] Inventors: Hee Young Jung; Bhum Cheol Lee; Kwon Chul Park, all of Daejeon, Rep. of Korea

[73] Assignees: Electronics and Telecommunications Research Institute; Korea Telecommunication Authority, Rep. of Korea

[21] Appl. No.: 571,077

[22] Filed: Dec. 12, 1995

[30] Foreign Application Priority Data

Dec. 23, 1994 [KR] Rep. of Korea ............... 1994-36126

[51] Int. Cl.$^6$ ................................................ G06F 11/10
[52] U.S. Cl. ........................ 370/474; 370/522; 371/37.7
[58] Field of Search ........................... 370/94.1, 100.1, 370/105.1, 105.4, 112, 60.1, 503, 509, 506, 510, 511, 512, 473, 474, 522; 371/37.1, 37.7, 42, 46; 375/357, 364; 380/9, 28

[56] References Cited

U.S. PATENT DOCUMENTS

| | | | |
|---|---|---|---|
| 4,397,020 | 8/1983 | Howson | 370/105 |
| 5,345,451 | 9/1994 | Uriu et al. | 371/37.7 |

*Primary Examiner*—Hassan Kizou
*Assistant Examiner*—Kwang Bin Yao
*Attorney, Agent, or Firm*—Blakely Sokoloff Taylor & Zafman

[57] ABSTRACT

A modified cyclic line coding apparatus for error detection and frame recovery which generates a n-bit modified cyclic cord-word by use of k redundancy bits and partially scrambles the cyclic redundancy check bits using periodic scramble bits. The apparatus includes a transmitter including a modified cyclic redundancy generator unit for generating redundancy bits, a variable period sampled scrambler unit for partially scrambling the redundancy bits, a timing control unit for generating a timing signal, and a multiplexer unit for multiplexing input cell data in accordance with the timing signal. The apparatus also includes a receiver including a modified cyclic redundancy checker unit for outputting a block synchronization signal and sample bits when a block synchronization is detected, while outputting a synchronization error signal when no block synchronization is detected, a variable period sampled descrambler unit for generating descramble bits in accordance with the sample bits, a timing recovering unit for generating a timing signal, and a demultiplexer unit for demultiplexing the cell data in accordance with the timing signal. The apparatus can use various cell sizes, can stably receive the user information of cell data and can achieve an easy bit timing detection.

1 Claim, 4 Drawing Sheets

CYCLIC LINE CODING APPARATUS FOR ERROR DETECTION AND FRAME RECOVERY

BACKGROUND OF THE INVENTION

1. Field of the Invention

The present invention relates to a cyclic line coding apparatus for error detection and frame recovery, and more particularly to a modified cyclic line coding apparatus capable of not only achieving a detection for errors on channels or lines by generating a n-bit code word by use of a small number of redundancy bits, but also achieving an easy bit timing detection at the receiver and an easy recovery of frames by generating at least one transition for every block of each frame constituted by a certain number of bit strings.

2. Description of the Prior Art

Although a variety of conventional line coding apparatuses have been known, they have various problems. One problem is that the line bit rate should be doubled due to bit strings having a very large number of redundancy bits even though they generate many transitions. In the case of reducing the number of redundancy bits, coding and decoding functions become complex. Alternatively, there is a limitation on the number of bits constituting a byte or block. For the distinction among blocks or frames, conventional line coding apparatuses use separate synchronous bits in addition to codes. A separate scrambling is also required to make bit strings random.

In order to solve the above-mentioned problems, CCITT (International Telegraph and Telephone Consultative Committee) of ITU (International Telecommunication Union) has recently proposed a cell identification algorithm using cyclic codes and distributed sampled scramblers for the user-network matching in the asynchronous transfer mode.

FIG. 1 is a block diagram illustrating a conventional cyclic line coding apparatus which realizes a transmitter and receiver of the cell identification algorithm using cyclic codes and distributed sampled scramblers for the user-network matching in the asynchronous transfer mode.

In FIG. 1, the reference numeral 11 denotes a cyclic redundancy generator unit, 12 a distributed sampled scrambler unit, 13 a timing control unit, 14 a multiplexer unit, 15 a cyclic redundancy checker unit, 16 a timing recovering unit, 17 a distributed sampled descrambler unit, and 18 a demultiplexer unit.

When cell data is received in the transmitter, the distributed sampled scrambler unit 12 scrambles user information included in the received cell data and then sends the resultant data to the multiplexer unit 14. The cyclic redundancy generator unit 11 executes a cyclic redundancy check (CRC) for a header of 32 bits included in the cell data in accordance with a timing signal received from the timing control unit 13. The timing signal is generated by the timing control unit 13 in accordance with a cell synchronization signal received from the external to the timing control unit 13. By the CRC operation, the cyclic redundancy generator unit 11 generates 8 header error check (HEC) bits and then samples two of the HEC bits which are, in turn, sent to the multiplexer unit 14 in order to enable the receiver to synchronize with the transmitter. The multiplexer unit 14 multiplexes the 32-bits cell header, the sampled and scrambled HEC bits and the user information in accordance with a timing signal generated from the timing control unit 13.

On the other hand, when the cell data is received in the receiver, the cyclic redundancy checker unit 15 executes a CRC operation to search for the cell header, thereby detecting sample bits. Using these sample bits detected by the cyclic redundancy checker unit 15, the distributed sampled descrambler unit 17 descrambles the input cell data and then sends the resultant data to the demultiplexer unit 18. The timing recovering unit 16 serves to recover the timing for the descrambling and demultiplexing operation in accordance with the synchronous signal detected by the cyclic redundancy checker unit 15, that is, the sample bits. The demultiplexer unit 18 demultiplexes the descrambled data from the distributed sampled descrambler unit 17 using the timing recovered by the timing recovering unit 16.

However, the above-mentioned conventional cyclic line coding apparatus can not ensure the user information bit string of cell data to always have transitions because the error detection for cell data is achieved on the basis of the 8 CRC bits generated by executing a CRC operation only for the 32-bits header of the cell data. As a result, there is a probability that a long bit string having no transition may be generated. Therefore, it is undesirable to use such data as a line code. When the scrambler unit, which scrambles the user information of the cell data, loses the synchronization, this effect is propagated and multiplied. There is also a problem that the cell size should be fixed because the identification for cells is achieved using cyclic codes.

SUMMARY OF THE INVENTION

Therefore, an object of the invention is to provide a cyclic line coding apparatus for error detection and frame recovery which generates a n-bit modified cyclic cord-word by use of k redundancy bits and partially scrambles the k-bit cyclic redundancy check bits using periodic scramble bits.

In accordance with the present invention, this object is accomplished by providing a cyclic line coding apparatus for error detection and frame recovery comprising: a transmitter including modified cyclic redundancy generator means for executing a cyclic redundancy check for every block of cell data received from the external, thereby generating redundancy bits enabling the cell data to have at least one transition for every block, a variable period sampled scrambler means for generating periodic sample and scramble bits in accordance with a cell synchronization signal and a cell period setting signal both received from the external and partially scrambling the redundancy bits generated from the modified cyclic redundancy generator means using the periodic sample and scramble bits, a timing control means for receiving a cell synchronization signal from the external and generating a timing signal required to multiplex the partially scrambled redundancy bits in accordance with the cell synchronization signal, and a multiplexer means for multiplexing user information of the cell data and the partially scrambled redundancy bits in accordance with the timing signal from the timing control means; and a receiver including a modified cyclic redundancy checker means for executing a cyclic redundancy check for every block of input cell data, thereby detecting a block synchronization, the modified cyclic redundancy checker means outputting a block synchronization signal and sample bits when the block synchronization is detected, while outputting a synchronization error signal when no block synchronization is detected, a variable period sampled descrambler means for generating descramble bits in accordance with the sample bits received from the modified cyclic redundancy checker means and a cell period setting signal received from the external, the cell period setting signal being identical to that used in the transmitter, the variable period sampled descrambler means sending the descramble bits to the modified cyclic redundancy checker means, a timing recovering means for receiving the block synchronization-detected result from the modified cyclic redundancy checker means and the cell synchronization-detected result from the variable period sampled descrambler means, thereby generating timing signals respectively associated with a search for the block synchronization and a search for the descramble bits synchronized with the transmitter, and a demultiplexer means for demultiplexing the cell data in accordance with the timing signals from the timing recovering means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
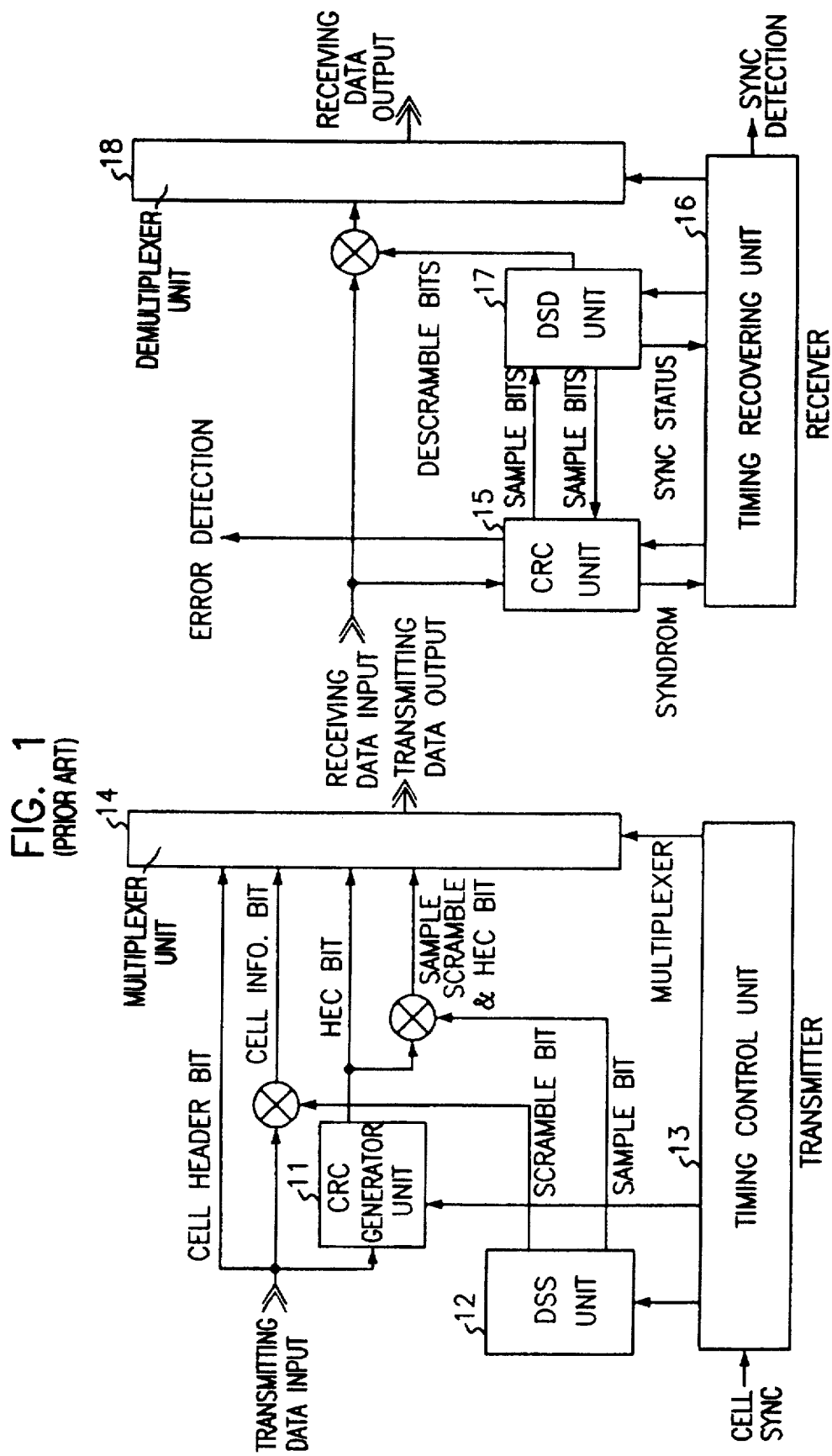
FIG. 1 is a block diagram illustrating a conventional cyclic line coding apparatus.
Figure 2:
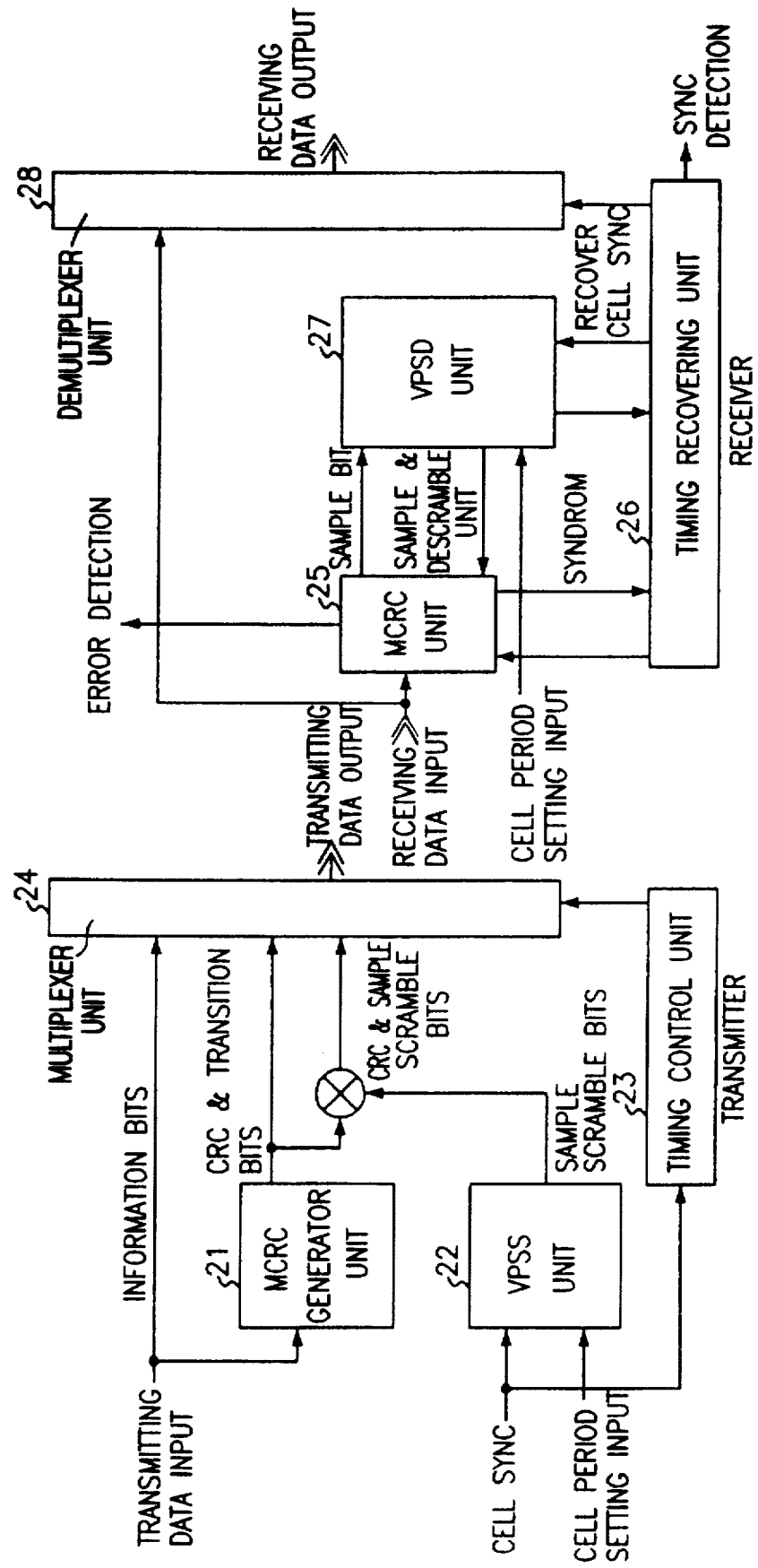
FIG. 2 is a block diagram illustrating a cyclic line coding apparatus according to the present invention.

FIG. 2 is a block diagram illustrating a cyclic line coding apparatus in accordance with the present invention.

In FIG. 2, the reference numeral 21 denotes a modified cyclic redundancy generator unit, 22 a variable period sampled scrambler unit, 23 a timing control unit, 24 a multiplexer unit, 25 a modified cyclic redundancy checker unit, 26 a variable period sampled descrambler unit, 27 a timing recovering unit, and 28 a demultiplexer unit.

The modified cyclic redundancy generator unit 21 serves to execute a CRC operation for every block of cell data received from the external using a characteristic polynomial, thereby generating k redundancy bits enabling the cell data to have a specified modulo when it is divided by the characteristic polynomial. The characteristic polynomial and modulo are given to provide at least one transition for 2(n−1) bit strings.

The variable period sampled scrambler unit 22 serves to generate periodic sample and scramble bits in accordance with a cell synchronization signal and a cell period setting signal, both received from the external. The period of the sample and scramble bits is variable in accordance with the cell period setting signal. The variable period sampled scrambler unit 22 samples and scrambles part of the k redundancy bits generated from the modified cyclic redundancy generator unit 21 by exclusively ORing (namely, XORing) the periodic sample and scramble bits with the part of the k redundancy bits.

The timing control unit 23 generates a timing signal required for a multiplexing operation of the multiplexer unit 24 in accordance with the cell synchronization signal received from the external.

The multiplexer unit 24 receives the user information bits received from the external without being scrambled, the redundancy bits generated from the modified cyclic redundancy generator unit 21 and the sampled and scrambled part of the redundancy bits output from the variable periodic sampled scrambler unit 22. The multiplexer unit 24 multiplexes the received bits in accordance with the timing signal generated from the timing control unit 23 and sends the resultant data to a transmission line.

On the other hand, the modified cyclic redundancy checker unit 25 receives input data from the transmitter via the transmission line. The modified cyclic redundancy checker unit 25 executes a CRC operation for the input data using the same characteristic polynomial as that used in the transmitter. That is, the modified cyclic redundancy checker unit 25 divides the input data by the characteristic polynomial, thereby detecting the non-scrambled portion of redundancy bits included in the input data along with the specified modulo. On the basis of the detected result, the modified cyclic redundancy checker unit 25 then detects the block synchronization. Thereafter, the modified cyclic redundancy checker unit 25 outputs the detected result and sample bit. Where the modified cyclic redundancy checker unit 25 does not detect any block synchronization, it outputs a synchronization error signal to the external.

The variable period sampled descrambler unit 27 receives the sample bits from the modified cyclic redundancy checker unit 25 and a cell period setting signal from the external. The cell period setting signal is identical to that used in the transmitter. In accordance with the received signals, the variable period sampled descrambler unit 27 generates sample and descramble bits which are, in turn, sent to the modified cyclic redundancy checker unit 25. In accordance with these sample and descramble bits from the variable period sampled descrambler unit 27, the modified cyclic redundancy checker unit 25 descrambles the scrambled portion of the redundancy bits in order to search for the complete block synchronization. The modified cyclic redundancy checker unit 25 also detects the period of the sample and scramble bits and outputs the detected result as a cell synchronization signal.

The timing recovering unit 26 receives the block synchronization-detected result from the modified cyclic redundancy checker unit 25, thereby generating a timing signal associated with the search for the block synchronization. The timing recovering unit 26 also receives the cell synchronization-detected result from the variable period sampled descrambler unit 27, thereby generating a timing signal associated with the search for the cell synchronization.

The demultiplexer unit 28 serves to demultiplex the input data received from the external without being scrambled in accordance with the timing signal from the timing recovering unit 26.

Figure 3:
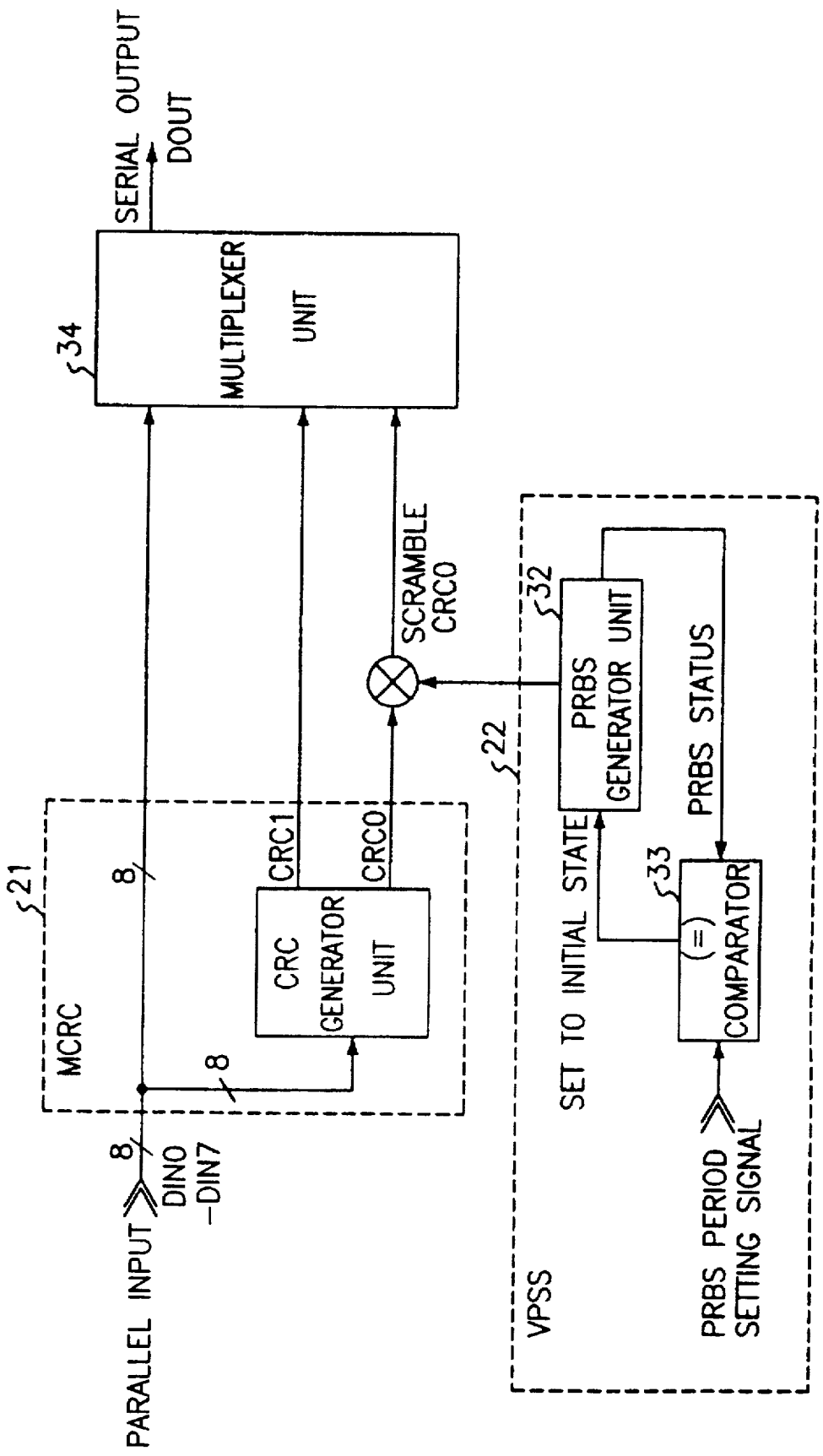
FIG. 3 is a block diagram illustrating a transmitter of the cyclic line coding apparatus according to the present invention.
Figure 4:
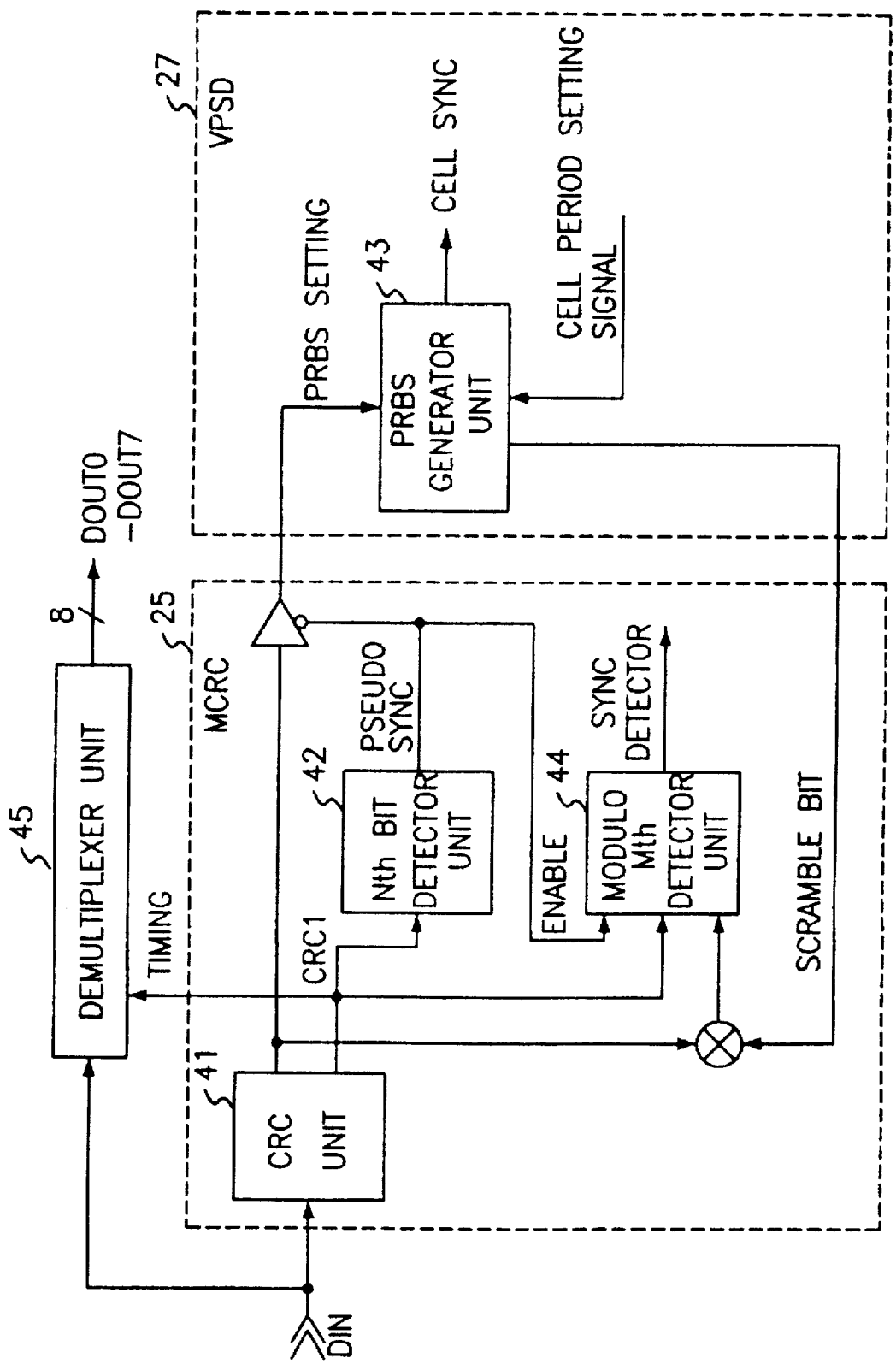
FIG. 4 is a block diagram illustrating a receiver of the cyclic line coding apparatus according to the present invention.

FIGS. 3 and 4 illustrate respective embodiments of the transmitter and receiver according to the present invention. In these embodiments, two redundancy bits are used (k=2) whereas the code-word is constituted by 10 bits (n=10), the sum of 8 bits of data and 2 bits as the redundancy bits.

In FIG. 3, which is a block diagram illustrating the transmitter according to the present invention, the reference numeral 31 denotes a cyclic redundancy generator unit, 32 a pseudo random binary sequence (PRBS) generator unit, 33 a comparator unit, and 34 a demultiplexer unit.

The cyclic redundancy generator unit 31 receives, as its input, parallel data of 8 bits from the external and executes a CRC operation for the input data using a characteristic polynomial of 3 bits, thereby generating 2 redundancy bits CRC0 and CRC1 so that the cell data can have a specified modulo when it is divided by the characteristic polynomial.

The PRBS generator unit 32 is adapted to periodically generate a random bit. The redundancy bit CRC0 generated by the cyclic redundancy generator unit 31 is exclusively ORed with the random bit. In other words, the redundancy bit CRC0 is scrambled using the random bits.

The comparator unit 33 receives a status signal output from the PRBS generator unit 32, which generates a cyclic random bit, and a signal for setting the PRBS period or cycle. The comparator unit 33 compares the received signals, thereby generating a control signal enabling the PRBS generator unit 32 to return to its initial state when the PRBS circulates by a required period. Thus, the PRBS generator unit 32 can always have the required period by the control signal received thereto from the comparator unit 33.

The multiplexer unit 34 receives the 8-bit parallel data received from the external, the redundancy bit CRC1 generated from the cyclic redundancy generator unit 31 and the scrambled redundancy bit obtained by scrambling the redundancy bit CRC0 output from the cyclic redundancy generator unit 31 using the random bit generated from the PRBS generator unit 32. The multiplexer unit 34 multiplexes the received bits, thereby outputting serial data having a coded 10-bit sequence.

In FIG. 4, which is a block diagram illustrating the receiver according to the present invention, the reference numeral 41 denotes a cyclic redundancy checker unit, 42 an Nth non-scrambled redundancy bit detector unit, 43 a PRBS generator unit, 44 an Mth specified modulo detector unit, and 45 a demultiplexer unit.

The cyclic redundancy checker unit 41 executes a CRC operation for serial input data received from the external, thereby detecting the block synchronization. For detecting the block synchronization, the cyclic redundancy checker unit 41 detects the non-scrambled redundancy bit CRC1. Using the detected block synchronization, the cyclic redundancy checker unit 41 extracts the scrambled redundancy bit SCRC0 and outputs it.

The Nth non-scrambled redundancy bit detector unit 42 receives, as its input, the result of the detection for the non-scrambled redundancy bit CRC1. When the Nth non-scrambled redundancy bit detector unit 42 continuously detects the non-scrambled redundancy bit CRC1 by N times, it outputs a pseudo synchronization signal.

The PRBS generator unit 43 receives a period setting signal identical to that used in the transmitter, thereby generating a cyclic random bit having the same generation period as that in the transmitter. In response to the generation of the pseudo synchronization signal, the PRBS generator unit 43 also receives the scrambled bit detected by the CRC detector unit 41. Using the received scrambled bit, the PRBS generator unit 43 corrects the cyclic sequence of the random bit and generates a scrambled bit being in sync with the serial input data received from the external. In accordance with the corrected cyclic sequence, the PRBS generator unit 43 detects a point of time when the status thereof is identical to that of the transmitter-side PRBS generator unit 32 and outputs the detected result as a cell synchronization signal.

When the pseudo synchronization is detected, the Mth specified modulo detector unit 44 retrieves both the non-scrambled redundancy bit CRC1 and the result obtained after descrambling the scrambled redundancy bit CRC0. The Mth specified modulo detector unit 44 generates a block synchronization signal when it continuously detects the redundancy bits CRC0 and CRC1 both generating the same modulo as that specified in the transmitter-side cyclic redundancy generator unit 31 by M times.

The demultiplexer unit 45 receives, as a timing signal for its demultiplexing operation, the pseudo synchronization signal which is generated when the cyclic redundancy checker unit 41 detects the redundancy bit CRC1 from the serial input data by N times. Upon receiving the timing signal, the demultiplexer unit 45 recovers the serial input data in the form of parallel data which will be finally output. The cyclic line coding apparatus having the above-mentioned arrangement according to the present invention has the following effects.

First, although the cell size should be fixed in the conventional apparatus because the identification for cells is achieved using CRC bits of the header, the present apparatus can use various cell sizes. In accordance with the present invention, the cell size is variable because the identification for cells is achieved using the period characteristics of sample and scrambled bits.

Second, when the scrambler unit of the conventional apparatus, which scrambles the user information of the cell data, loses the synchronization, this effect is propagated and multiplied. However, the present apparatus does not involve such a problem because the user information is not scrambled in accordance with the present invention. Even when the scrambler loses the synchronization, the apparatus of the present invention can stably receive the user information of cell data.

Third, the present apparatus can achieve an easy bit timing detection because it executes a CRC operation for every block of cell data using a characteristic polynomial and modulo specified such that at least one transition is provided for 2(n−1) bit strings.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cyclic line coding apparatus for error detection and frame recovery over a digital transmission line comprising:
   a transmitter including
   a modified cyclic redundancy generator means for executing a cyclic redundancy check for every block of cell data received from the digital transmission line, thereby generating redundancy bits enabling the cell data to have at least one transition for every block,
   a variable period sampled scrambler means for generating periodic sample and scramble bits in accordance with a cell synchronization signal and a cell period setting signal both received from the digital transmission line and partially scrambling the redundancy bits generated from the modified cyclic redundancy generator means using the period sample and scramble bits,
   a timing control means for receiving a cell synchronization signal from the digital transmission line and generating a timing signal required to multiplex the partially scrambled redundancy bits in accordance with the cell synchronization signal, and a multiplexer means for multiplexing user information of the cell data and the partially scrambled redundancy bits in accordance with the timing signal from the timing control means; and a receiver including a modified cyclic redundancy checker means for executing a cyclic redundancy check for every block of input cell data, thereby detecting a block synchronization, the modified cyclic redundancy checker means outputting a block synchronization signal and sample bits when the block synchronization is detected, while outputting a synchronization error signal when no block synchronization is detected, a variable period sampled descrambler means for generating descramble bits in accordance with the sample bits received from the modified cyclic redundancy checker means and a cell period setting signal received from the digital transmission line, the cell period setting signal being identical to that used in the transmitter, the variable period sampled descrambler means sending the descramble bits to the modified cyclic redundancy checker means, a timing recovering means for receiving the block synchronization-detected result from the modified cyclic redundancy checker means and the cell synchronization-detected result from the variable period sampled descrambler means, thereby generating timing signals respectively associated with a search for the block synchronization and a search for the descramble bits synchronized with the transmitter, and a demultiplexer means for demultiplexing the cell data in accordance with the timing signals from the timing recovering means.

* * * * *